United States Patent
Heflinger

(10) Patent No.: US 6,512,618 B1
(45) Date of Patent: *Jan. 28, 2003

(54) BROADCAST OPTICAL COMMUNICATION SYSTEM EMPLOYING WAVEGUIDE HAVING GRATING NORMAL TO SOURCES AND DETECTORS

(75) Inventor: Donald G. Heflinger, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/336,019

(22) Filed: Jun. 18, 1999

(51) Int. Cl.[7] .......................... H04J 14/02; H04B 10/02; H01L 29/40; G02B 6/28
(52) U.S. Cl. .................. 359/173; 359/127; 359/130; 257/777; 385/24; 385/37
(58) Field of Search ................................. 359/173, 127, 359/130; 385/14, 24, 37; 257/777, 432, 686

(56) References Cited

U.S. PATENT DOCUMENTS

| 4,089,584 | A | * | 5/1978 | Polczynski | 385/24 |
|---|---|---|---|---|---|
| 4,749,248 | A | | 6/1988 | Aberson et al. | 385/37 |
| 5,042,897 | A | | 8/1991 | Meltz et al. | 385/37 |
| 5,113,403 | A | | 5/1992 | Block et al. | 359/152 |
| 5,204,866 | A | | 4/1993 | Block et al. | 372/27 |
| 5,307,437 | A | * | 4/1994 | Facq et al. | 385/124 |
| 5,568,574 | A | * | 10/1996 | Tanguay, Jr. et al. | 385/14 |
| 6,321,001 | B1 | * | 11/2001 | Heflinger | 385/24 |
| 6,353,264 | B1 | * | 3/2002 | Coronel et al. | 257/777 |

* cited by examiner

Primary Examiner—Leslie Pascal
Assistant Examiner—David Payne
(74) Attorney, Agent, or Firm—Robert W. Keller

(57) ABSTRACT

A broadcast optical communication system is disclosed. It comprises an optical waveguide having a plurality of gratings. A first grating is disposed at a first node and couples light impinging normally into the waveguide, propagates coupled light bi-directionally through the waveguide and emits a portion of the coupled light at a second grating in a direction normal thereto. An optical source is disposed proximate the first node for transmitting light normally to the first grating and an optical detector is disposed proximate the second node for detecting the normally emitted light. In another embodiment multiple optical waveguides and source-detector pairs are employed in a parallel data architecture to provide multiple channel broadcast communication.

24 Claims, 1 Drawing Sheet

BROADCAST OPTICAL COMMUNICATION SYSTEM EMPLOYING WAVEGUIDE HAVING GRATING NORMAL TO SOURCES AND DETECTORS

BACKGROUND OF THE INVENTION

1. Field of the Invention

The present invention relates generally to optical communication systems, and, more particularly, to an, optical communication system employing an optical waveguide with grating couplers disposed normal to the light sources and detectors.

2. Description of the Prior Art

Optical communication between circuits disposed parallel to each other has been described in which the optical light beam containing the data is in the form of a circularly polarized optical wave transmitted via free space, polarizers and beam splitting cubes. This optical link transmits the data from a source to an optical detector in the receiving circuit. Connectivity between the circuits requires collimation of the light for free-space propagation and thus must rely on line of sight for connectivity. Moreover, several optical elements are required including a one-quarter wave plate, a collimating lens, and a polarization beam splitting cube, all of which require precise optical alignment. Examples of the prior art are found in U.S. Pat. No. 5,204,866 and U.S. Pat. No. 5,113,403.

Various constructions of optical waveguides, including optical fibers, are provided with embedded gratings for either inserting light into or for removing light from the respective optical waveguide at an intermediate location or at different intermediate locations of the waveguide. For instance, U.S. Pat. No. 4,749,248 to Aberson, Jr., et al, discloses a device for tapping radiation from, or injecting radiation into, a single mode optical fiber. This patent discloses that it is possible to convert a guided mode in an optical fiber into a tunneling leaky mode or vice versa by forming a grating of appropriate periodicity at least in the core of the optical fiber, and either to remove the guided mode from the fiber core into the cladding by converting it into the leaky mode, and ultimately from the fiber altogether, or to insert light of an appropriate wavelength into the core to form a guided mode therein by directing light of a proper wavelength from the exterior of the fiber toward the grating to propagate in the fiber cladding and to be converted by the grating into the guided mode in the fiber core. The grating is formed in such a manner that fiber core regions of identical optical properties are situated in planes oriented normal to the longitudinal axis of the optical fiber. The '248 patent, and also U.S. Pat. No. 5,042,897 to Meltz, et al, depicts the source being disposed at an acute angle to the waveguide so as to launch light longitudinally in one direction. Consequently, the source can only communicate to a selected node or nodes in the launched direction.

Also, dielectric waveguides comprising grating couplers have been developed for providing wavelength selective filters. One such application is in the distributed feedback (DFB) laser diode where the grating provides wavelength selective feedback to the laser cavity. When a second order grating is used in a DFB laser, the grating is capable of transmitting a portion of the light that is flowing through the waveguide normal to the surface of the dielectric waveguide, and thereby couple light out the top surface of the laser. This application of a grating coupler is able to couple light traveling in both directions within the dielectric waveguide to a free space beam that leaves the waveguide normal to the surface of the dielectric waveguide.

Today, an optical data bus architecture that generally employs a broadcast approach is desired. A broadcast approach is one that provides optical connectivity between any node on a data bus to all other nodes and its requirements are described in a military standard, namely MIL-STD-1773. MIL-STD-1773 establishes the criteria necessary for the optical data bus to be compatible with an electronic data bus and defines the required connectivity for an optical data bus and its protocol for addressing nodes within a system, but does not disclose a communication system.

What is needed, therefore, is an optical communication system that uses an optical waveguide with gratings disposed normal to the sources and detectors in the transmitting and receiving circuits, respectively, for carrying optical data bi-directionally through the waveguide such that the same data is provided simultaneously to multiple nodes in a broadcast manner.

SUMMARY OF THE INVENTION

The preceding and other shortcomings of the prior art are addressed and overcome by the present invention which provides a broadcast optical communication system. The system comprises an optical waveguide having a plurality of gratings. A grating is disposed at a first node and couples light impinging normally thereto into the waveguide, the coupled light propagates bi-directionally through the waveguide. A second grating emits a portion of the coupled light in a normal direction from the waveguide. An optical source is disposed proximate the first node for transmitting light normally to the first grating, and an optical detector is disposed proximate the second node for detecting the normally emitted light.

In another embodiment multiple optical waveguides and source-detector pairs are employed in a parallel data architecture to provide multiple channel broadcast communications.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE INVENTION

Figure 1:
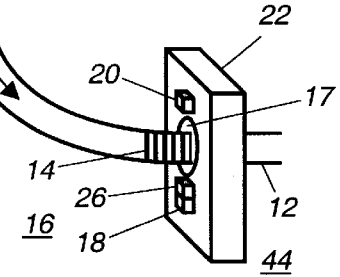
FIG. 1 is a diagrammatic view of an optical communication system in accordance with the present invention.

Referring now to the drawing and more particularly to FIG. 1 thereof, a broadcast optical communication system in accordance with the present invention, generally identified by the numeral 10, is disclosed. The broadcast optical communication system is also referred to as a vertical integrated optical data bus (VIODB). The optical communication system 10 comprises an optical waveguide 12 having a plurality of gratings 14, each defining a node 16. At each node 16 there is a source 18 of light, and a light detector, 20.

The optical waveguide 12 is an elongated optical fiber formed from a dielectric material having an index of refraction $n_2$ that is greater than the refraction $n_1$ of the medium adjacent the waveguide (i.e. air). The waveguide has a characteristic propagating mode or modes. The fiber serves to propagate light longitudinally and bi-directionally therethrough. It is preferably formed from an optically transparent medium, such as glass or a polymer, and conveys light over a distance while preserving its wavefront and intensity distribution.

The grating 14 is formed on the surface of the waveguide 12 and extends into the fiber (or subjacent the surface) in the case of a bulk grating. The grating serves to Bragg diffract a normally incident light beam and launch it bi-directionally in equal amounts. Thus it couples the normally incident light and sends a portion of it into a propagating mode of the waveguide, which in turn propagates the light longitudinally and bi-directionally through it as illustrated by the arrow 15. When the guided mode of propagating light reaches another grating 14 the recipient grating Bragg diffracts and couples a portion of the propagating light out of the waveguide into free space as shown by the numeral 17. In this Bragg coupling process the optically transparent waveguide conveys light over a distance without changing the wavefront or intensity distribution of the propagating light. The grating 14 is preferably made within the fiber as a periodic variation of the refractive index grating. The grating 14 provides an extended aperture for coupling light at each node 16 that extends for many wavelengths of the light that is coupled, and thus the output coupled light 17 is in the form of a narrow, collimated beam confined to a plane normal to the waveguide. Due to the narrow extent of the aperture along the length of the waveguide, the output coupled light 17 spreads with a relatively large divergence angle within the plane normal to the waveguide.

The source 18 of light, or the optical transmitter, is mounted on a substrate 22 at each of the nodes 16 and transmits a coherent, monochromatic beam of light having a wavelength λ. The source 18 is positioned with the detector 20 on the surface of the substrate 22 on opposite sides of an opening surrounding the optical waveguide such that its transmitted beam of light is conveyed in a direction normal to the grating 14, and generally parallel to the surface of the substrate 22. In the preferred embodiment the source is a laser diode that transmits a beam of light having a wavelength of 1.3 nanometers (nm). The transmitted light has a coherent frequency and a cross-section that is not collimated, but diverges as the transmitted light propagates through the air toward the grating 14. The divergence of the laser beam is generally about 30 degrees. This divergence leads to a reduction in the coupling efficiency with the optical waveguide as will be later described, but provides greater alignment tolerance when used directly to couple light into the optical waveguide. Alternatively, the source can be a light emitting diode (LED) which transmits a beam of light with a delivery that diverges at greater angles than that transmitted by a laser diode. A modulator 26 disposed adjacent the light emitted by light source 18 on the surface of the substrate 22 externally modulates the light source 18 so as to provide an optical signal data stream with a data rate above 10 gigabits per second (Gbps). Alternatively, the current to the laser diode can be directly modulated up to data rates of 2.5 Gbps and no external modulation is necessary.

The detector 20, or optical receiver, is positioned at each of the nodes 16 facing the light source 18. The detector 20 senses the light beam outcoupled by the grating 14 and converts the optical signal into an electrical signal for processing by an amplifier and signal processing circuitry (not shown). In the preferred embodiment the detector 20 is a high speed semiconductor photodiode with an extremely small detection area, around 500 square microns. The light that is output coupled from the grating 14 is reasonably well collimated in the plane of substrate 22 into a narrow beam due to the extended aperture of the grating.

In operation the sources 18 transmit an optical signal in the form of beams of modulated light normally towards the optical waveguide 12 at a node 16. The grating 14 serves to Bragg diffract and couple the normally incident light into modes of propagation of the waveguide that propagate longitudinally and bi-directionally through the waveguide in the direction of the arrows 15. At each grating 14, a portion of the propagating light is coupled out of the dielectric waveguide as shown by the arrow 17 and onto the detectors 20. The detectors 20 convert the detected optical signal into an electrical signal for subsequent processing by signal processing circuitry. In this manner the light, and hence the data contained therein is broadcast to the detectors. Moreover, because the light flows bi-directionally, all detectors receive some of the propagating incident light flowing through the waveguide. Thus the data transmitted in one of the optical signal beams from the source at one node is received at all the other nodes in the optical communication system. A part of the protocol for such a broadcast optical communication requires that only one optical source 18 transmit at a time to avoid bus contention.

Figure 2:
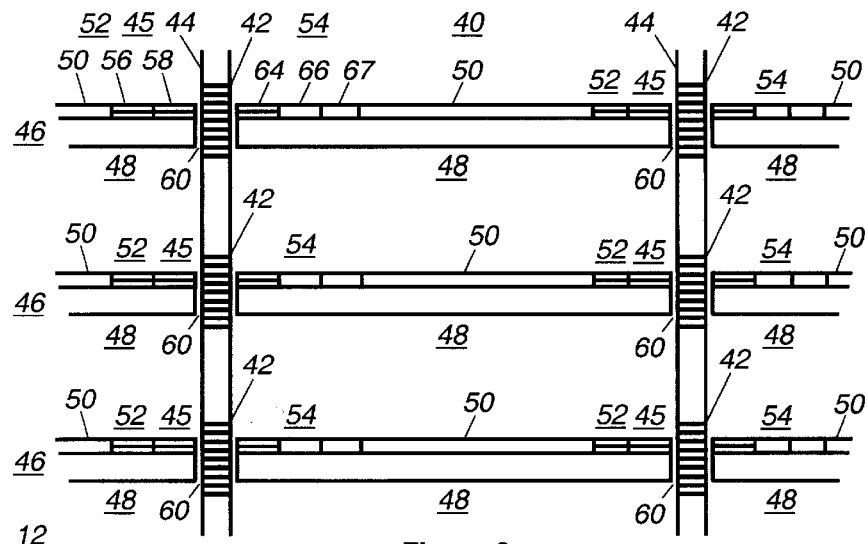
FIG. 2 is a diagrammatic view of an alternative embodiment of a multichannel optical communication system in accordance with the present invention.

Referring now to FIG. 2 an embodiment of a multichannel broadcast optical communication system 40 is shown. In this embodiment, gratings 42 are employed to couple optical signals into and out of multiple optical waveguides 44 that constitute vertical integrated optical data buses. The buses 44 extend at nodes 45 through openings in a stack of integrated circuit wafers 46.

Each wafer 46 is supported by a substrate 48 similar to that identified as 22 in FIG. 1, and has a conventional round disk shape that resembles a platter having a semiconductor layer 50 formed thereon. The substrate 48 is formed from a material having a relatively high thermal conductivity, such as diamond or sapphire. The semiconductor layer 50 is generally planar, and composed of silicon, gallium arsenide, indium phosphide, or a like material. It has a thickness of about 10 microns, and includes thousands of optoelectronic devices or components formed by monolithic wafer scale integration (WSI) techniques. The optoelectronic components particularly comprise a transmitter 52 and a receiver 54.

The transmitter 52 comprises a light source 56 for emitting a coherent, monochromatic beam of light, and an external modulator 58. The light source 56 is preferably incorporated as a hybrid element onto the semiconductor layer 50 at the node 45. Alternatively, it maybe grown expitaxally on the layer 50 using regrowth of gallium arsenide, indium phosphide or a like semiconductor material on silicon technology, or it may be made from porous silicon optical emitters. The light source 56 is placed adjacent to the external modulator 58 which is disposed proximate one of the set of through holes 60 such that the light that it transmits from its edge propagates in a direction parallel to the coplanar surface of the wafer 46 towards the grating 42. The transmitted coherent monochromatic light has a cross section that diverges as it propagates. This divergence leads to a reduced coupling efficiency with the waveguide 44 but allows for greater alignment tolerance.

The external modulator 58 is preferably an electro absorption modulator that is capable of producing an optical signal having data rates above 10 Gbps. The electro absorption modulator 58 is integrated into the layer 50 and is made from the same semiconductor material as the light source 56. Alternatively, it is made from a material that is highly compatible with gallium arsenide, or indium phosphide technology, which have been used for millimeter wave integrated circuits.

The receiver 54 includes at each node 45 a detector 64, an amplifier 66 and signal processing circuitry 67. The detector 64 is positioned proximate to and at the edge of the through hole 60 facing the grating 42 and the light source 56. It detects the emitted optical signals and converts them into an electrical signal that is amplified by the amplifier 66 and then processed by the signal processing circuitry 67. As will be described, the light output coupled out from the grating 42 is collimated into a narrow beam constrained to a plane normal to the waveguide 44 by the extended grating aperture.

The optical waveguides 44 extend through the openings 60 normal to the plane of the wafers 46 and hence to the transmitters 52 and receivers 54. The optical waveguide includes grating couplers 42 at each transmitter/receiver pair, also referred to as a node 45.

Figure 3:
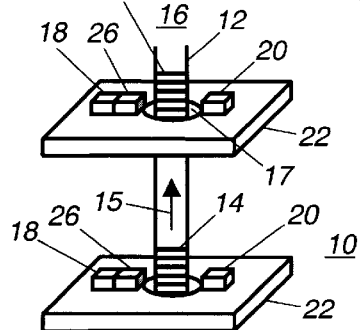
FIG. 3 is a partial diagrammatic view of the optical waveguide shown in FIG. 2 in accordance with the of the present invention.
Figure 3:
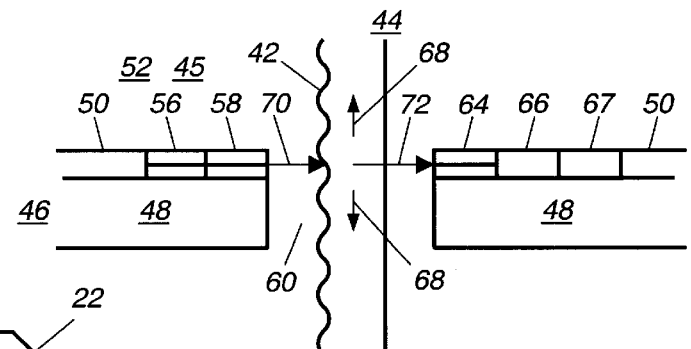

As shown in FIG. 3, the optical waveguide 44 is a dielectric slab made from an optically transparent material, such as glass, a polymer material, or an optical semiconductor and supports a characteristic propagating mode or modes. It has an index of refraction $n_2$ and a periodic Bragg surface grating 42. Mask techniques or holographic interference techniques are used to make the periodic Bragg gratings 42 on the surface of the slab. The Bragg surface grating 42 has a period $\Lambda$ and serves to Bragg diffract and couple the incident light transmitted by the light source 56 and delivered by external modulator 58 (shown by numeral 70) into a propagating mode of the waveguide 44 which conveys the light axially and bi-directionally through the dielectric slab waveguide as illustrated by the arrows 68. This light is launched equally in both directions. At each grating 42 a portion of the light flowing axially through the slab is Bragg diffracted and coupled out of the waveguide in a direction normal thereto (shown by the numeral 72) and hence through the surrounding air and into the detectors 64. Since the light propagates in both directions all detectors receive some of the propagating incident light flowing through the waveguide. In this way the data contained in the optical signal transmitted by a transmitter at one node is received by detectors at all the other nodes. The grating 42 allows for coupling from both sides of the waveguide 44, enabling the transmitters 52 to be positioned on one side of the openings 60 and the receivers 54 to be positioned on the opposite side for each node 45. FIG. 3 shows how the wafer 46 provides for the transmitter 52, comprising of a light source 56 that delivers light to an external modulator 58 integrated into the layer 50 supported by substrate 48 and the receiver 54, comprising the detector 64, amplifier 66, and signal processing circuitry 67.

Figure 4:
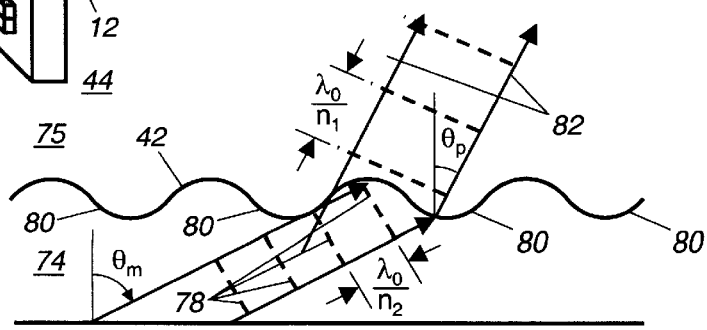
FIG. 4 is a diagrammatic view illustrating light coupling out of a grating coupler.

Referring now to FIG. 4, the dielectric slab waveguide 44 comprises three adjacent layers of optically transparent material with the refractive index $n_2$ of the middle core layer 74 being greater than the refractive indices $n_1$ and $n_3$ of the two outer cladding layers, 75 and 76 respectively.

The guided propagating modes will depend on the wavelength of light, $\lambda_0$ the indexes of refraction of each layer, $n_1$, $n_2$, and $n_3$, and the thickness d of the core layer, 74. Because the propagating mode in the dielectric waveguide has evanescent electric field tails that extend from the core into the cladding, the periodic grating 42 at the interface between the core 74 and the cladding Bragg diffracts the propagating light out of the waveguide 44.

The rays of the propagating mode of light approach the grating at the allowed angles for propagation denoted by $\theta_m$. This angle of approach establishes a wavefront 78 which is scattered from the periodic grooves 80 of the grating 42. Each groove 80 in the grating 42 scatters light in all directions out of the waveguide. When adjacent groves are driven by light that has a fixed phase lag set by the propagation angle of incidence, the scatter direction of adjacent grooves is constructive and adds up in phase for one particular output coupling angle, $\phi_p$, as shown in FIG. 4 by arrows 82. At this output coupling angle, $\phi_p$, the light is launched out of the waveguide to propagate in free space.

The relation for this grating output coupled light is given in terms of the angle of the propagating mode, $\theta_m$, the wavelength of light, $\lambda_0$, the period of the grating, $\Lambda$, and the refractive indexes of the interface as, $$n_2 \sin\theta_m + n_1 \sin\phi_p = \frac{p\lambda_0}{\Lambda} \quad (1)$$

where p is the output coupled order.

The above description has been described for the case of the grating output coupler. Since light has a reciprocity property, the above description and equation also describes the conditions for input coupling light from free space into a propagating mode of the waveguide.

Thus the same grating period is used for both output coupling and input coupling.

In accordance with the present invention, a special condition exists when the grating output coupling angle, $\phi_p$, is zero degrees which is at an angle perpendicular to the waveguide. For this case, equation (1) becomes $$n_2 \sin\theta_m = \frac{\lambda_0}{\Lambda} \quad (2)$$

This expression is the second order Bragg condition for a propagating mode of light to become reflected back on itself within the waveguide. So at this normal angle of grating output coupling, the light inside the waveguide happens to also scatter constructively into a mode that is guided by the waveguide and propagates in the opposite direction of the original propagating light. In the case of input coupling, the light is launched into the waveguide in both propagating directions (see FIG. 3) simultaneously. This enables simultaneous broadcast to all the nodes on the optical data bus.

The scattering effect described above pertains to grating coupling light via a Bragg interaction with the corrugated periodic set of surface grooves 80 (FIG. 4). The same effect occurs from a periodic variation of the refractive index in the core region of the dielectric waveguide, such as in a volume Bragg grating formed in an optical fiber. In this case, intense light at short ultra violet wavelengths is used to chemically change the glass inside the core of the optical fiber and result in a refractive index change. By making this change occur in a periodic way through the well known use of optical interference and holographic techniques, a volume grating is made inside the core of the optical fiber. This volume grating produces the same effect on the light propagating inside the core as the surface grating. Thus, volume Bragg gratings formed in optical fiber can be used for the dielectrical optical waveguide 44 with grating couplers 42 in this invention.

Expression (2) is valid for light that impinges at exactly normal incidence, that is when $\phi_p=0$ in expression (1). This condition is easily met by a fraction of the light transmitted by a laser diode when the plane of the emitting junction of the laser diode is oriented perpendicular to the propagation direction of the dielectric waveguide. Since the aspect dimension of the emitting junction of the laser diode is small in a direction perpendicular to the plane of the junction, the emitted light diffracts over an angular spread of typically 30 degrees in a direction perpendicular to the junction plane. By orienting the dielectric waveguide with its length along this angular spread, a portion of the incident light is always oriented at exactly normal incidence and thus can grating couple into the dielectric waveguide in both directions. The angular spread of 30 degrees delivered by the optical source greatly reduces the alignment tolerance required of the optical sources.

The light emitted from the external modulator 58 will also diffract over an angular spread of typically 30 degrees in a direction perpendicular to the junction plane. This is because the aspect dimension of the emitting junction of the external modulator 58 is small in a direction perpendicular to the plane of the junction. Since the junction plane is grown parallel to the plane of the wafer 46, the emitted light from the modulator 58 will also be spread along the length of the dielectric waveguide just as was the case for a laser source. Thus, there will be a reduced alignment tolerance of the external modulators also.

In a similar way, the light that is output coupled from the grating coupler experiences a similar diffraction that again reduces alignment tolerance of the detectors. The light is emitted, according to expression (2), at an angle that is exactly normal to the dielectric waveguide surface, that is when $\phi_p=0$ in expression (1). This means that the detectors must be positioned in a plane that is exactly normal to the dielectric waveguide. However, due to the narrow extend of this grating coupler in a direction parallel to this normal plane, there will be diffraction of this output coupled light causing an angular spread within this normal plane. This angular spread reduces the placement tolerance required of the photodetector within this plane. In addition, the fact that the output coupled light has a narrow angular spread in a direction that is perpendicular to this normal plane helps to direct the light to where the photodetector is positioned, thus improving detection efficiency.

In operation, the optical sources 52 transmit optical signals in the form of modulated light beams in the plane of the wafers 46. The transmitted beams thus are normally incident on the Bragg gratings 42 on the side of the dielectric waveguides 44. The waveguides 44 are oriented perpendicular to the stacked wafers 46. Each grating 42 couples the normally incident transmitted light bi-directionally into a propagating mode of its associated waveguide, which in turn sends the light toward the nodes in the other stacked wafers. A portion of the propagating light is coupled out (shown by the arrow 72 in FIG. 3) of the waveguide by each grating in a direction normal to the waveguide toward the respective optical detector 64. Thus, light from a transmitted optical signal is transferred to the detectors on the other wafers. Only a fraction of the light is coupled out by each grating so that light remains in the waveguide to propagate toward the next transmitter/receiver pair at the node of the downstream wafer in the stack. In this way the data transmitted by a transmitter/receiver pair at a node on one wafer is received by the nodes on all the other wafers. Since the grating coupler is designed to couple normal incident light, the light is launched in both directions axially through the waveguide ensuring that wafers both above and below (as shown in FIG. 2) the wafer on which the light source is located receive the data. Note that each waveguide carries data so that the plurality of waveguides provide a plurality of parallel optical data streams or paths.

The integrated optical data bus enables data transfer at multi gigabit rates between stacked wafers of integrated circuit. This provides optical connectivity between any one node on the data bus and all other nodes via a general broadcast approach.

In another embodiment, the optical waveguide comprises a thin sliver of dielectric material that enables guided mode propagation. In this configuration, the surrounding air, which has a lower refractive index than the thin sliver of dielectric material, and thus provides for total internal reflection of the propagating mode serves as the outer layer of the waveguide. The use of air interfaces as part of the waveguide greatly simplifies the manufacture of the dielectric waveguide with its grating coupler.

In another embodiment a dielectric slab waveguide is made of an InGaAsP semiconductor, transparent to a wavelength of 1.32 um. This is a commonly used wavelength delivered by semiconductor lasers made of the same material. For this case, $n_1=1.0$, $n_2=3.35$, and $n_3=3.2$ where the composition of the layers of the InGaAsP semiconductor have been appropriately adjusted to achieve these refractive indexes. The core layer thickness is d=0.8 um which sets up a propagating mode with a ray tracing or propagation angle $\theta_m$ of 79.6 degrees. By using a grating period of 0.4005 um a grating coupler is formed that will deliver light normal to the waveguide surface or couple light incident normally to the surface in both directions in the waveguide.

Another embodiment comprises an optical fiber (single mode SMF-28 fiber) dielectric waveguide in which the refractive indexes of a glass optical fiber are $n_1=1.4595$, $n_2=1.461$, and $n_3=1.4595$. The core diameter of the single mode SMF-28 fiber is d=9.0 um. The wavelength is 1.55 um, which is becoming very common in the telecommunication field because an optical fiber has lower loss at this wavelength than at 1.32 um. These parameters result in a guided mode propagation angle, $\theta_m=88.23$ degrees. By using a volume grating with a period of 1.06 um, the propagating light can be coupled in or out normally to the fiber.

In general, the coupling efficiency is relatively low, usually being under 25%, unless special grating profiles are used to launch the light in one particular mode and not any other permitted modes. For the present invention, the relatively low efficiency enables many nodes to use the same length of dielectric waveguide. Thus the low efficiency is actually an advantage. If the coupling efficiency were too great, the propagating light would be emitted by the intermediate nodes and would not reach the last node on the dielectric waveguide.

It will be appreciated by persons skilled in the art that the present invention is not limited to what has been shown and described hereinabove. The scope of the invention is limited solely by the claims which follow.

What is claimed is:

1. An optical data bus for communicating optical data in a broadcast manner comprising:
   a first light source located on a first plane for transmitting an optical signal containing optical data in the direction of said plane;
   a first detector located on a second plane for receiving light containing said optical data flowing in the direction of said second plane; and
   an optical waveguide disposed substantially perpendicular to said first and second planes and serving to propagate light therethrough, said waveguide including first grating means for coupling the optical signal transmitted by said first source into said waveguide and second grating means for coupling light flowing through said waveguide out of said waveguide and into said first detector.

2. The optical data bus as set forth in claim 1, wherein said first source is integrated into a wafer.

3. The optical data bus as set forth in claim 2, wherein said source is a laser.

4. The optical data bus as set forth in claim 2, wherein said source is a light emitting diode.

5. The optical data bus as set forth in claim 1, and further comprising an external modulator for modulating said optical signal.

6. The optical data bus as set forth in claim 1, wherein said first source is integrated into a first wafer and said first detector is integrated into a second wafer.

7. The optical data bus as set forth in claim 6, wherein said first wafer includes a second detector and said second wafer includes a second source.

8. The optical data bus as set forth in claim 7, wherein said first source and said second detector are coplanar and wherein said second source and said first detector are coplanar.

9. The optical data bus as set forth in claim 8, and further comprising a third wafer including a third source and a third detector lying on a planar surface normal to said waveguide, and wherein a third grating means is disposed proximate said third source and said third detector, such that light transmitted by said first source is also coupled to said third detector.

10. The optical data bus as set forth in claim 1, wherein said grating means comprises a volume refractive index grating.

11. The optical data bus as set forth in claim 1, wherein said grating means comprises a Bragg diffraction surface.

12. The optical data bus as set forth in claim 1, wherein said optical waveguide comprises an optical fiber.

13. The optical data bus as set forth in claim 1, wherein said optical waveguide comprises an optical dielectric slab.

14. The optical data bus as set forth in claim 13, wherein said dielectric slab is comprised of three layers of optically transparent material, each having a refractive index, the refractive index of the middle layer being greater than those of the outer layers.

15. The optical communication system as set forth in claim 1, and further comprising a plurality of wafers, each having a source and a receiver lying on a planar surface planar to said coplanar surfaces, wherein said optical waveguide extends to all said wafers and includes grating means proximate said respective sources and detectors for coupling light at substantially right angles such that light transmitted by said first source is coupled to all said detectors.

16. An optical communication system comprising:
   a plurality of wafers disposed parallel to each other, each wafer including a multiplicity of coplanar light sources and light detectors and having a multiplicity of through holes, each through hole being proximate to a light source and a light detector; and
   a multiplicity of optical waveguides extending through respective through holes normally to a corresponding light source and light detector, each said optical waveguide including a plurality of grating means disposed proximate corresponding light sources and light detectors for coupling light emitted by a light source at substantially right angles into said waveguide and for coupling light propagating through said waveguide to a detector, such that when light containing optical data is transmitted by any source it is coupled into the waveguide to each grating means which emits a portion of the propagating light to its associated detectors on the same waveguide, thereby providing a multiplicity of parallel data paths.

17. The optical communication system as set forth in claim 16 wherein said light source comprises a laser.

18. The optical communication system as set forth in claim 16 wherein said light source comprises a light emitting diode.

19. The optical communication system as set forth in claim 16, and further comprising an external modulator for modulating the light transmitted by said light source.

20. The optical communication system as set forth in claim 16, wherein said grating means comprise a volume refractive index grating.

21. The optical communication system as set forth in claim 16, wherein said grating means comprise a Bragg surface grating.

22. The optical communication system as set forth in claim 16, wherein said optical waveguides comprise an optical fiber.

23. The optical communication system as set forth in claim 16, wherein said optical waveguides comprise an optical dielectric slab.

24. The optical communications system as set forth in claim 23, wherein said dielectric slab is comprised of three layers of optically transparent material, each having a refractive index, the refractive index of the middle layer being greater than those of the outer layers.

* * * * *